United States Patent [19]
Genbauffe et al.

[11] Patent Number: 4,662,393
[45] Date of Patent: * May 5, 1987

[54] PROPELLANT STORAGE CONSTRUCTION, PARTS THEREFOR AND METHODS OF MAKING THE PARTS

[75] Inventors: Francis S. Genbauffe, Irwin; Joseph J. Erdelsky, Jeannette; Harvey J. Shopsky, Latrobe, all of Pa.

[73] Assignee: Robertshaw Controls Company, Richmond, Va.

[*] Notice: The portion of the term of this patent subsequent to Jul. 31, 2001 has been disclaimed.

[21] Appl. No.: 604,954

[22] Filed: Apr. 27, 1984

Related U.S. Application Data

[62] Division of Ser. No. 326,703, Dec. 2, 1981, Pat. No. 4,462,424.

[51] Int. Cl.[4] .............................................. B65D 83/00
[52] U.S. Cl. ..................... 137/613; 137/71; 222/397; 222/399; 277/3; 277/27; 277/110
[58] Field of Search ............. 137/60 R, 71; 222/396, 222/397, 399, 496; 137/613, 513.3, 855; 277/3, 27, 110–112; 92/102

[56] References Cited

U.S. PATENT DOCUMENTS

| | | | |
|---|---|---|---|
| 2,813,543 | 11/1957 | Todd | 137/513.3 |
| 2,991,918 | 7/1961 | Allen | 222/476 |
| 3,239,101 | 3/1966 | Wilson | 222/396 |
| 3,245,583 | 4/1966 | Miller et al. | 222/399 |
| 3,265,060 | 8/1966 | Schreiber | 137/513.3 |
| 3,610,273 | 10/1971 | Russell | 137/513.3 |
| 3,648,893 | 3/1972 | Whiting | 222/397 |
| 3,762,431 | 10/1973 | Wilson et al. | 222/399 |

*Primary Examiner*—A. Michael Chambers
*Attorney, Agent, or Firm*—Candor, Candor & Tassone

[57] ABSTRACT

A propellant storage construction having a chamber for storing the propellant and a passage leading to the chamber and containing a valve unit therein for opening and closing the passage, the passage having a flow restricting unit therein intermediate the valve unit and the chamber to limit the flow rate of the propellant from the chamber through the valve unit to a certain low flow rate when the valve unit is in an open position to dispense the propellant. The flow restricting unit has a part thereof providing a full flow rate therethrough at a substantially greater flow rate than the certain low flow rate when the valve unit is in an open position to permit a charge of the propellant to be fed through the open valve unit to the chamber for filling the chamber with the propellant.

15 Claims, 11 Drawing Figures

PROPELLANT STORAGE CONSTRUCTION, PARTS THEREFOR AND METHODS OF MAKING THE PARTS

CROSS REFERENCE TO RELATED APPLICATION

This application is a Divisional patent application of its copending parent patent application, Ser. No. 326,703, filed Dec. 2, 1981 now U.S. Pat. No. 4,462,424, issued July 31, 1984.

BACKGROUND OF THE INVENTION

1. Field of the Invention

This invention relates to an improved propellant storage construction and to improved parts therefor as well as to the methods of making the improved parts for the propellant storage construction.

2. Prior Art Statement

It is known from the U.S. Pat. No. 3,245,583 to Miller et al to provide a propellant storage construction having a chamber for storing the propellant and a passage means leading to the chamber and containing a valve unit therein for opening and closing the passage means, the passage means having flow restricting means therein intermediate the valve unit and the chamber to limit the flow rate of the propellant from the chamber through the valve unit when the valve unit is in an open position to dispense the propellant. For example, see the flow restricting tube 30 having the crimped end 36 in FIGS. 4 and 17 of U.S. Pat. No. 3,245,583 to Miller.

It is also known from U.S. Pat. No. 3,762,431 to Wilson et al to provide a propellant storage construction having a storing chamber for storing the propellant and a passage means leading to the storage chamber and containing a valve unit therein for opening and closing the passage means, the construction having a pressure regulating means operatively associated with the valve unit for operating the valve unit in relation to the pressure of the propellant. The pressure regulating means comprises a self-contained capsule having a movable wall for engaging the valve unit and an opposed wall spaced therefrom by a side wall. The construction has wall means cooperating with the capsule to define an output chamber for receiving propellant dispensed from the storing chamber through the valve unit. An annular sealing means is disposed between and against the capsule and the wall means to define the output chamber therebetween. For example, see FIG. 3 of U.S. Pat. No. 3,762,431, to Wilson et al, wherein the rolled edge 78 of the capsule 68 seals against the sealing member 98 to define the output chamber 100.

It is also known to provide pressure relief means for the aforementioned output chamber of the propellant storage construction. For example, see FIG. 4 of the aforementioned U.S. Pat. No. 3,245,583, to Miller et al, wherein a relief valve means 180 is provided for the output chamber 152 and see FIG. 3 of the aforementioned U.S. Pat. No. 3,762,431, to Wilson et al, wherein the capsule 68 compresses into the gasket 99 to lift off the rolled edge 78 of the capsule 68 from the sealing member 98 to relieve pressure from the output chamber 100.

SUMMARY OF THE INVENTION

It is one feature of this invention to provide an improved propellant storage construction wherein flow control means are provided for restricting the flow rate of the propellant being dispensed therefrom while permitting a full flow rate when propellant is being fed into the propellant storage construction.

In particular, it was found according to the teachings of this invention that while it was desirable to provide propellant flow restricting means for feeding the propellant from the storage chamber of the propellant storage construction through a pressure regulated valve unit in order to minimize icing of such valve unit, a prior known flow restricting tube means required a separate valve arrangement for bypassing the flow restricting tube in order to permit propellant to be charged into the storing chamber of the propellant storage construction.

However, it was found according to the teachings of this invention that the flow restricting means could be uniquely formed to provide a full flow rate therethrough when a charge of the propellant is being fed through the dispensing valve unit to fill the storage chamber with the propellant.

For example, one embodiment of this invention provides a propellant storage construction having a chamber for storing the propellant and a passage leading to the chamber and containing a valve unit therein for opening and closing the passage, the passage having a flow restricting means therein intermediate the valve unit and the chamber to limit the flow rate of the propellant from the chamber through the valve unit to a certain low flow rate when the valve unit is in an open position to dispense the propellant. The flow restricting means has means providing a full flow rate therethrough at a substantially greater flow rate than the certain low flow rate when the valve unit is in an open position to permit a charge of the propellant to be fed through the open valve unit to the chamber for filling the chamber with the propellant.

It is another feature of this invention to provide an improved propellant storage construction wherein improved sealing of the self-contained capsule of the pressure regulating means thereof is provided.

In particular, it was found according to the teachings of this invention that a prior known self-contained can or capsule of the pressure regulating means could not be formed sufficiently accurately to permit the rolled edge thereof to effectively seal against an annular resilient gasket disposed between that annular rolled edge and a flat surface of the housing structure containing such capsule unless an expensive machining operation was preformed on such rolled edge.

However, it was found according to the teachings of this invention that effective sealing of such a pressure regulator capsule can be provided by disposing an annular sealing means to seal against only the side wall of the capsule and an adjacent wall of the housing structure whereby no sealing means is required for the annular rolled edge of such capsule and, thus, the expensive machining operation for such rolled edge is eliminated.

For example, one embodiment of this invention provides a propellant storage construction having a storing chamber for storing the propellant and a passage means leading to the storing chamber and containing a valve unit therein for opening and closing the passage means, the construction having a pressure regulator means operatively associated with the valve unit for operating the valve unit in relation to the pressure of the propellant. The pressure regulator means comprises a self-contained capsule having a movable wall for engaging the valve unit and an opposed wall spaced therefrom by a side wall. The construction has wall means cooperating with the capsule to define an output chamber for receiving propellant dispensed from the storing chamber through the valve unit. Annular sealing means is disposed between and against the capsule and the wall means to define the output chamber therebetween, the annular sealing means being telescoped onto the side wall of the capsule and thereby engaging and sealing against the side wall of the capsule intermediate the opposed wall and the movable wall of the capsule.

It is another feature of this invention to provide an improved propellant storage construction having improved means for relieving excess pressure in the output chamber thereof.

In particular, it was found according to the teachings of this invention that even though a pressure relief valve means is disposed in fluid communication with the output chamber of the pressure regulator means of the propellant storage construction in order to relieve excess pressure in the output chamber, a failure of such pressure relief valve might take place, such as through an adverse icing of the pressure relief valve structure.

However, it was found according to the teachings of this invention that the wall means of the pressure regulator means that defines part of the output chamber could be provided with a burst section that would fracture when the pressure value in the output chamber exceeded a safe limit.

For example, one embodiment of this invention provides a propellant storage construction having a storing chamber for storing the propellant and a passage means leading to the storing chamber and containing a valve unit therein for opening and closing the passage means, the construction having a pressure regulator means operatively associated with the valve unit for operating the valve unit in relation to the pressure of the propellant. The construction has wall means defining an output chamber for receiving propellant dispensed from the storing chamber through the valve unit. The construction has outlet means for directing the dispensed propellant from the output chamber. The construction has an integral burst section that is adapted to fracture when the pressure value of the propellant in the output chamber exceeds a certain value.

Accordingly, it is an object of this invention to provide an improved propellant storage construction having one or more of the novel features of this invention as set forth above or hereinafter shown or described.

It is another object of this invention to provide an improved part for such a propellant storage construction, the improved part of this invention having one or more of the novel features of this invention as set forth above or hereinafter shown or described.

Another object of this invention is to provide a method of making such an improved part for a propellant storage construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter described and illustrated as being particularly adapted to provide a propellant storage construction wherein the propellant is gaseous $CO_2$ for carbonating beverages and the like, it is to be understood that the various features of this invention can be utilized singly or in any combination thereof to provide means for dispensing other types of propellants for other purposes as desired.

Therefore, this invention is not to be limited to only the embodiments illustrated in the drawings, because the drawings are merely utilized to illustrate one of the wide variety of uses of this invention.

Referring now to FIGS. 1-6, an improved propellant storage construction of this invention is generally indicated by the reference numeral 20 and comprises a propellant storage container 21, an adaptor 22 having one end 23 thereof secured in an opening 24 of the storage container 21 and a pressure regulator means that is generally indicated by the reference numeral 25 and is secured to the other end 26 of the adapter 22.

Figures 1, 2:
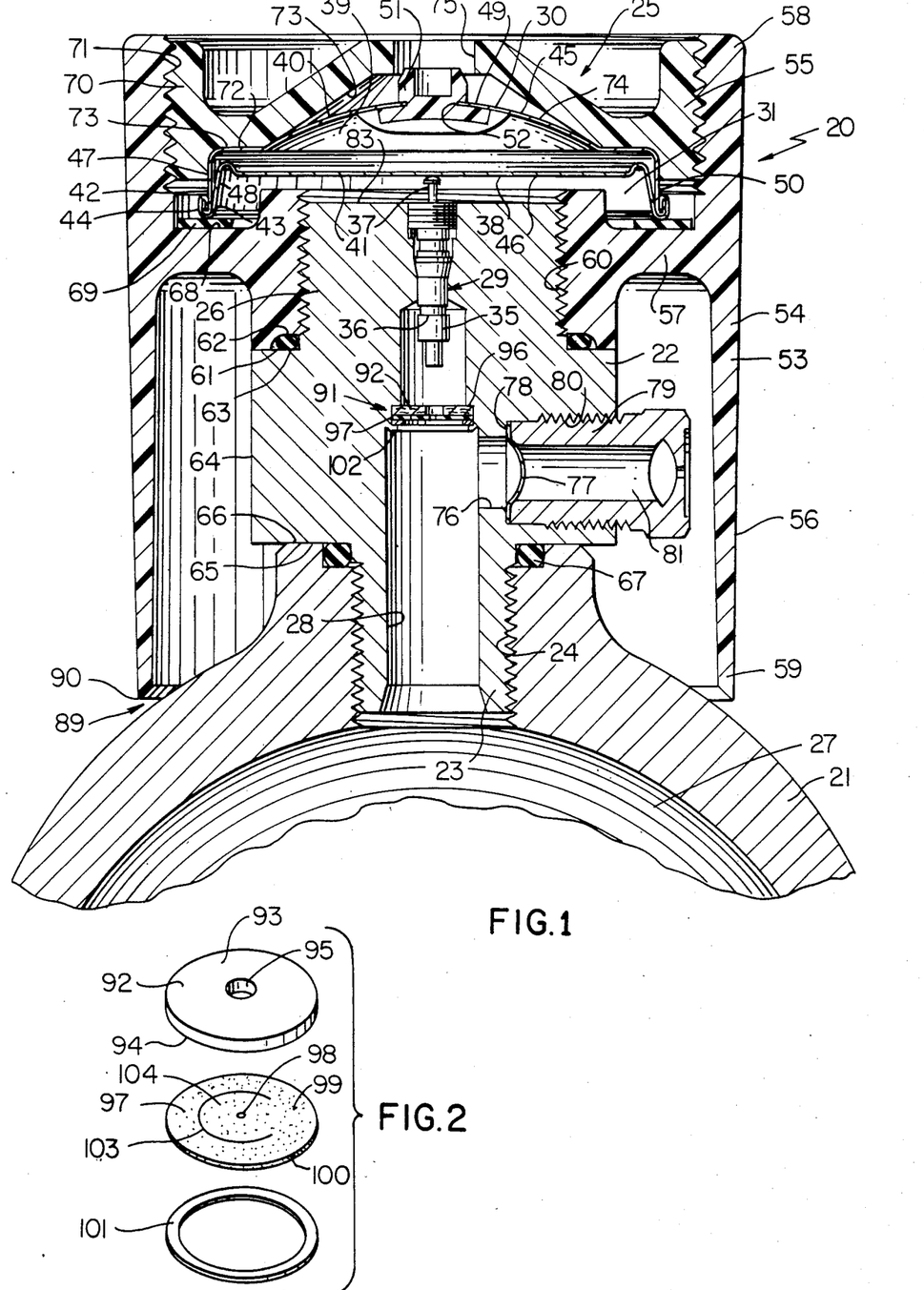
FIG. 1 is a fragmentary cross-sectional view illustrates one embodiment of the improved propellant storage construction of this invention.
FIG. 2 is an enlarged exploded perspective view of the parts for forming the propellant flow restricting means of the propellant storage construction of FIG. 1.

The container 21 has a storing chamber 27 therein for containing a pressurized supply of a propellant, such as $CO_2$, that is adapted to pass through a passage means 28 of the adapter 22 and through a valve unit 29 disposed in the passage means 28 and controlled by a self-contained can or capsule 30 of the pressure regulator means 25 so as to be received in an output chamber 31 of the pressure regulator means 25 at a reduced pressure value from the pressure value of the propellant in the storing chamber 27 in order to be suitable for carbonating beverages and the like, the dispensed propellant in the output chamber 31 being fed to a conduit means 32 when an outlet coupling member 33 is interconnected to an outlet means 34 of the pressure regulator means 25 in a manner hereinafter described.

In general, the storing, pressure regulating and dispensing operation previously described is substantially the same as set forth in the aforementioned U.S. Pat. No. 3,762,431, to Wilson et al, whereby such patent is being incorporated into this disclosure by this reference thereto in order to provide further information concerning the use and operation of certain parts of the propellant storage construction 20 of this invention.

However, sufficient features of the propellant storage construction 20 of this invention will now be described in order to fully understand the improved features of this invention.

The valve unit 29 has a valve member 35 movable relative to a valve seat 36 by the movement of an axially movable plunger 37 that is under control of a movable wall 38 of the self-contained capsule 30 so that as the movable wall 38 moves downwardly in FIG. 1, the valve member 35 is moved away from the valve seat 36 to permit propellant from the storing chamber 27 to pass through the passage means 28 into the output chamber 31, the pressure of the propellant now dispensed into the chamber 31 acting on the wall 38 in a direction tending to move the wall 38 upwardly in FIG. 1 to permit the valve member 35 to move to a closed position whereby the combination of the self-contained capsule 30 and the valve unit 29 will maintain the pressure of the dispensed propellant into the output chamber 31 at a predetermined pressure value as determined by the pressure of the fluid contained in the chamber 39 of the capsule 30 as is well known in the art.

The capsule 30 comprises two generally cup-shaped metallic members 40 and 41 telescoped together and sealed together at their respective open ends 42 and 43 by a seaming operation that forms a rolled-over flange or edge 44 in a manner similar to a chime on a can. The respective closed ends 45 and 46 of the cup-shaped members 40 and 41 are spaced from the respective open ends 42 and 43 by annular side wall means 47 and 48 whereby the closed end 46 of the cup-shaped member 41 defines the movable wall 38 of the capsule 30 while the closed end 45 of the cup-shaped member 40 defines an opposed wall 49 of the capsule 30, the side wall 45 of the cup-shaped member 40 defining a side wall 50 of the capsule 30.

In order to introduce the desired fluid into the chamber 39 of the capsule 30 after the cup-shaped members 40 and 41 have been seamed together at the rolled edge 44, a resilient sealing member 51 is sealed in an opening 52 in the closed end 45 of the cup-shaped member 40 to permit a charging needle to be inserted therethrough to inject fluid into the chamber 39 in a manner well known in the art.

The pressure regulator means 25 includes a housing means 53 formed of two housing parts 54 and 55 and can be formed of any suitable material, such as plastic material molded into the configurations illustrated in the drawings.

The housing member 54 has a substantially H-shaped cross-sectional configuration defined by an outer annular portion 56 and a cross portion 57 disposed intermediate the opposed ends 58 and 59 of the annular portion 56, the cross portion 57 having an internally threaded opening 60 passing therethrough so as to be threadedly disposed on the externally threaded end 26 of the adapter 22. A suitable O-ring sealing member 61 seals an end surface 62 of the cross portion 57 of the housing member 53 to an annular shoulder means 63 of the adapter 22 defined by an enlarged hexagonally shaped medial portion 64 of the adapter 22 which readily permits conventional tools to thread the externally threaded end 23 thereof into the threaded opening 24 of the container 21 until a lower annular shoulder 68 of the adapter 22 abuts an annular shoulder 66 of the container 21 as illustrated in FIG. 1, an annular O-ring sealing member 67 being compressed between the shoulder means 65 and 66 to seal the adapter 22 in the opening 24 of the container 21 as illustrated.

The cross portion 57 of the housing member 54 has an annular substantially flat surface 68 on which an annular flexible sealing member 69 is disposed and against which the annular rolled edge 44 of the self-contained capsule 30 engages to seal therewith and thereby define the output chamber 31 of the pressure regulator means 25 inside the annular chime or edge 44 of the capsule 30.

The other housing member 55 has an externally threaded portion 70 threadedly disposed in an internally threaded portion 71 of the end 58 of the housing member 54 so that a suitably shaped surface means 72 of the housing member 55 will engage against an outer annular substantially flat portion 73 of the opposed wall 49 of the capsule 30 as well as extend along part of the side wall 50 of the capsule 30 as illustrated in FIG. 1 whereby the housing part 55 holds the capsule 30 in sealing relation against the annular sealing means 69 to maintain the output chamber 31 suitably sealed.

However, in order to insure that the annular edge 44 seals completely around the annular sealing member 69, the annular edge 44 is lapped or otherwise machined to render the edge 44 substantially coplanar.

The surface means 72 of the housing member 55 has a frusto-conical portion 73 so as to be disposed spaced from a domed portion 74 of the wall 49 of the capsule 30 and is provided with a central opening 75 therethrough in aligned relation with the sealing member 51 to permit injection of fluid into the capsule 30, as desired.

The central section 64 of the adapter 22 has a stepped cross opening 76 interconnecting with the passage means 28 and containing a safety rupture disc 77 held against an annular shoulder 78 of the adapter 22 by an externally threaded retainer 79 disposed in a threaded portion 80 of the stepped opening 76, the retainer 79 having passage means 81 formed therethrough in a conventional manner to permit excess pressure in the storage chamber 27 to exit to the exterior of the construction 20 should that excess pressure exceed a safe value and thereby fracture the rupture disc 77 in a manner well known in the art.

Figure 4:
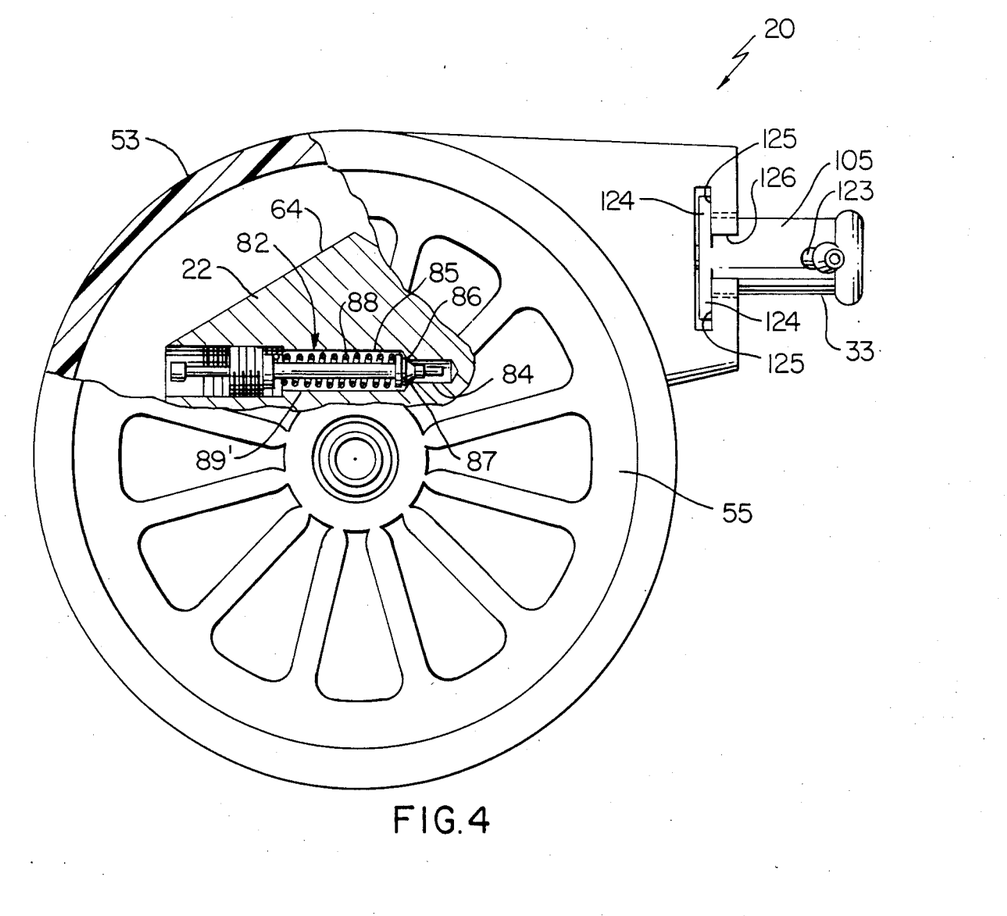
FIG. 4 is a top view of the propellant storage construction of FIG. 1, FIG. 4 being partially broken away to illustrate a relief valve means of the construction.

The medial portion 64 of the adapter 22 also contains a pressure relief valve means that is generally indicated by the reference numeral 82 in FIG. 4 for preventing the pressure value of the propellant dispensed into the output chamber 31 from exceeding a predetermined value.

In particular, a suitable opening (not shown) is formed through the upper end surface 83 of the end 26 of the adapter 22 so as to be in fluid communication with the output chamber 31 and leads to a reduced portion 84 of a stepped bore means 85 formed in the medial section 64 of the adapter 22. The stepped bore means 85 defines a valve seat 86 that is normally closed by a valve member 87 under the force of a compression spring 88 so that the output chamber 31 is sealed from the atmosphere interconnected portion 89' of the stepped bore means 85 by the valve member 86. However, should the pressure in the output chamber 31 exceed a certain value, the same acts on the valve member 87 and moves the valve member 87 to an open position relative to the valve seat 86 so that the excess pressure in the output chamber 31 can be passed to the atmosphere through the now opened valve unit 82.

It can be seen that the end portion or annular skirt 59 of the housing member 54 of the pressure regulator means 25 not only protects the rupture disc 77 and pressure relief valve means 82 from tampering, but also such skirt portion 59 protects the user from any propellant being initially passed out of a ruptured disc 77 and/or opened pressure relief means 82 as the expelled propellant will be contained in the skirt portion 59 and will exit through the annular spaced 89 defined between the lower end 90 of the skirt portion 59 and the container 21.

In fact, it was found according to the teachings of this invention that the space 89 should be of a sufficient size to prevent a jet propulsion effect on the propellant storage construction 20 should the rupture disc 77 fracture and cause such a rush of propellant out of the opening means 76 that the same would cause a jet effect by passing out of the space 89 if the space 89 is too narrow.

Figure 5:
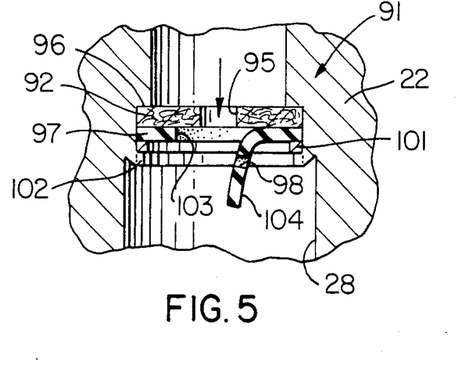
FIG. 5 is an enlarged fragmentary view of the flow restricting means of the propellant storage construction of FIG. 1, FIG. 5 illustrating the flow restricting means during a propellant filling operation.
Figure 6:
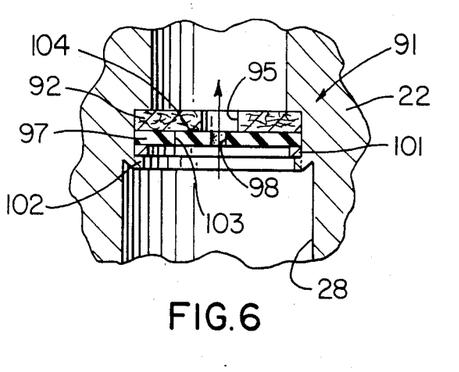
FIG. 6 is a view similar to FIG. 5 and illustrates the flow restricting means during a propellant dispensing operation.

An improved flow control means of this invention, generally indicated by the reference numeral 91 in FIGS. 1, 2, 5 and 6, is disposed in the passage means 28 and acts as a flow restricting means when propellant from the chamber 27 is being dispensed through the valve unit 29 to the output chamber 31 as illustrated in FIG. 6 and acts as a now-flow restricting means when propellant is being charged into the chamber 27 by being passed through the open valve unit 29 during a filling operation as illustrated in FIG. 5.

The flow control means 91 includes a first relatively rigid disc-like and washer-like member 92 having opposed flat sides 93 and 94 respectively being interrupted by a central, relatively large opening 95, the washer-like member 92 being disposed in the passage means 28 of the adapter 22 downstream from the valve unit 29 and against an annular shoulder 96 thereof.

A flexible, relatively thin washer-like member 97 has a relatively small opening 98 passing through the opposed flat sides 99 and 100 thereof so as to be coaxially aligned with the opening 95 of the washer-like member 92 when the same are disposed in the stacked relation as illustrated in FIGS. 1, 5 and 6 and held thereagainst by an annular retaining ring 101 disposed against the side 100 of the washer-like member 97 and held in place by a turned-over or staked edge 102 of the adapter 22 so that the washer-like members 92 and 97 and retaining ring 101 are disposed in stacked relation against the shoulder 96 of the adapter 22.

The medial portion of the flexible washer-like member 97 is cut through at 103 to define an integral, hinged flap 104 thereof which is larger than the opening 95 of the washer-like member 92.

In this manner, when the valve unit 29 is opened by the movable wall 38 of the capsule 30 to dispense propellant from the storing chamber 27 to the output chamber 31, the resulting pressure differential acting across the washerlike member 97 holds the flap 104 in the closed condition against the washer-like member 92 in the manner illustrated in FIG. 6 so that the entire flow of propellant through the flow control means 91 is controlled by the small opening 98 in the flexible washer-like member 97 to insure that should the valve unit 29 fail in an open condition thereof, icing of the relief valve means 82 to prevent the relief valve means from operating properly cannot take place whereby such relief valve means 82 will prevent the resulting pressure in the chamber 31 from exceeding a safe value under this condition. Thus, the flow control means 91 acts as a safety means for the relief valve means 82 by preventing too great a flow of $CO_2$ to the relief valve means that would cause icing close thereof should the valve unit 29 fail in an open condition thereof. In addition, it may be found under certain conditions that the flow control means 91 will insure that substantially only gaseous propellant will be permitted to pass to the opened valve unit 29 so as to prevent ice particles and the like from reaching the valve unit 29 for the reasons fully set forth in the aforementioned U.S. Pat. No. 3,245,583 to Miller et al, which is being incorporated into this disclosure by this reference thereto for a discussion of the reasons for desiring propellant flow control to the valve unit 29.

However, when it is desired to charge the container 21 with a charge of propellant, the housing means 53 is removed and suitable equipment (not shown) is disposed against the end 26 of the adapter 22 to open the valve member 35 away from the valve seat 36 by acting on the plunger 37. Thereafter, such equipment introduces the charge of propellant through the open valve member 29 and the passage means 28 into the chamber 27, the pressure differential now acting across the resilient washer-like member 97 moving the flap 104 away from the washer-like member 92 as illustrated in FIG. 5 to provide a full flow through the flow control means 91 during the charging or recharging of the propellant chamber 27. In this manner, a separate filling valve arrangement is not necessary as is required in a prior known propellant storage construction.

Figure 3:
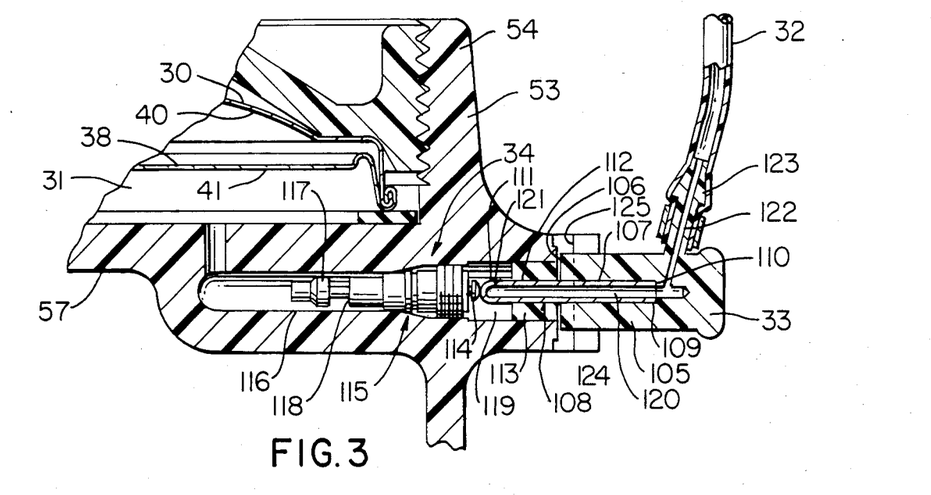
FIG. 3 is a fragmentary cross-sectional view of a part of the propellant storage construction of FIG. 1 and illustrates the structure for dispensing propellant therefrom.

The outlet coupling member 33 of FIG. 3 is generally of the type fully disclosed in the aforementioned U.S. Pat. No. 3,762,432, to Wilson et al, and includes a body portion 105 having an end surface 106 interrupted by an opening 107 into which a needle-like member 108 is press-fitted or otherwise secured in such a manner that one end 109 thereof bottoms out against an internal shoulder 110 of the body portion 105 and the other end 111 thereof projects beyond the end 106 of the body portion 105 a distance sufficient to be fully inserted through an opening 112 in a flexible sealing member 113 and engaged against an axially movable plunger 114 of a valve unit 115 that is disposed in an outlet passage 116 formed in the housing member 54 when the outlet coupling member 33 is fully inserted in the outlet means 34 in the condition illustrated in FIG. 3.

The plunger 114 of the valve unit 115 moves a movable valve member 117 away from the valve seat 118 when the plunger 114 is in its inward position as illustrated in FIG. 3 to permit propellant from the output chamber 31 to flow through the outlet passage 116 and open valve unit 115 to the space 119 disposed between the valve unit 115 and the sealing member 113 to enter into an internal passage 120 of the needle-like member 108 through side opening means 121 in the end 112 of the needle-like member 108 to thereby flow through a passage means 122 formed in a nipple extension 123 of the body portion 105 and into the conduit 32 which is telescoped onto the nipple portion 123 as illustrated.

The body portion 16 of the outlet coupling member 33 has a pair of opposed wing-like interlocking tabs 124 which respectively interlock with interlocking surface means 125 of the housing member 54 when the body portion 105 has been axially inserted to the position illustrated in FIG. 3 and been rotated 90° so as to dispose the wings 124 behind the interlocking surface means 125 as illustrated in FIG. 4.

When it is desired to operate the propellant storage construction 20 to dispense propellant from the storing chamber 27 thereof to the desired area interconnected to the conduit 32, the operator merely takes the outlet coupling member 33 and inserts the needle-like member 108 thereof through the opening 112 in the sealing member 113 to cause the end 111 thereof to engage against the axially movable plunger 114 and open the valve seat 118 of the valve unit 115 as illustrated in FIG. 1. And by locking the wing-like members 124 behind the locking surface means 125 through rotation of the inserted body member 105, the coupling member 33 will remain in the position illustrated. in FIG. 3 so that propellant from the output chamber 31 can flow through the opened valve unit 115, needle-like member 108, coupling member 33 and conduit 32 to the desired location.

However, as fully set forth in the co-pending application, Ser. No. 326,529, filed Dec. 2, 1981, it was found that because the sealing member 113 must be sufficiently flexible to provide for sealing against the needle-like member 108 when the same has been inserted through the opening 112 thereof, the sealing member 113 is not sufficiently effective in axially guiding the needle-like member 108 so as to be coaxially aligned with the plunger 114 so that any angularity between the plunger 114 and its needle-like member 108 during the insertion of the needle-like member 103 through the sealing member 113 causes the rounded end of the needle-like member 108 to slip off of the rounded end of the plunger 114 whereby the plunger 114 does not open the valve unit 115 even through the outlet coupling member 33 has been fully inserted into the outlet means 34. Thus, it was found according to the teachings of the invention of the aforementioned co-pending patent application, Ser. No. 326,529, filed Dec. 2, 1981, that an improved outlet coupling member could be provided which will not slip off of the plunger 114 of the valve unit 115 and will be more readily aligned in the outlet passage 116 for proper sealing therewith, such outlet coupling member of such patent application being illustrated in FIGS. 10 and 11 of this application and will be hereinafter described.

Nevertheless, as the pressure regulator means 25 opens the valve unit 29 to cause propellant to enter the output chamber 31 to replace the propellant being fed therefrom by the conduit means 32, the flow control means 91 is in the condition illustrated in FIG. 6 wherein the entire flow of propellant from the storing chamber 27 must pass through the small opening 98 of the washer-like member 97 in the manner previously described.

When it is desired to no longer dispense prepellant through the conduit means 32, the outlet coupling member 33 is rotated to clear the wing-like members 124 from the surface means 125 so as to be aligned with slot means 126 to permit the body portion 105 of the outlet coupling member 33 to be axially moved out of the outlet means 34 whereby the valve unit 115 closes to prevent any propellant from leaving the output chamber 31.

As previously stated, should an excess pressure exist in the output chamber 31, either during a dispensing operation as previously described or while the propellant storage construction 10 is in a non-dispensing condition thereof, the pressure relief valve means 82 will open to prevent the pressure in the output chamber 31 from exceeding a safe level thereof.

Another propellant storage construction of this invention is generally indicated by the reference numeral 20A in FIGS. 7-11 and parts thereof similar to the propellant storage construction 20 previously described are indicated by like reference numerals followed by the reference letter 'A", the propellant storage construction 20A presently being a preferred embodiment over the embodiment 20 previously described.

Figure 8:
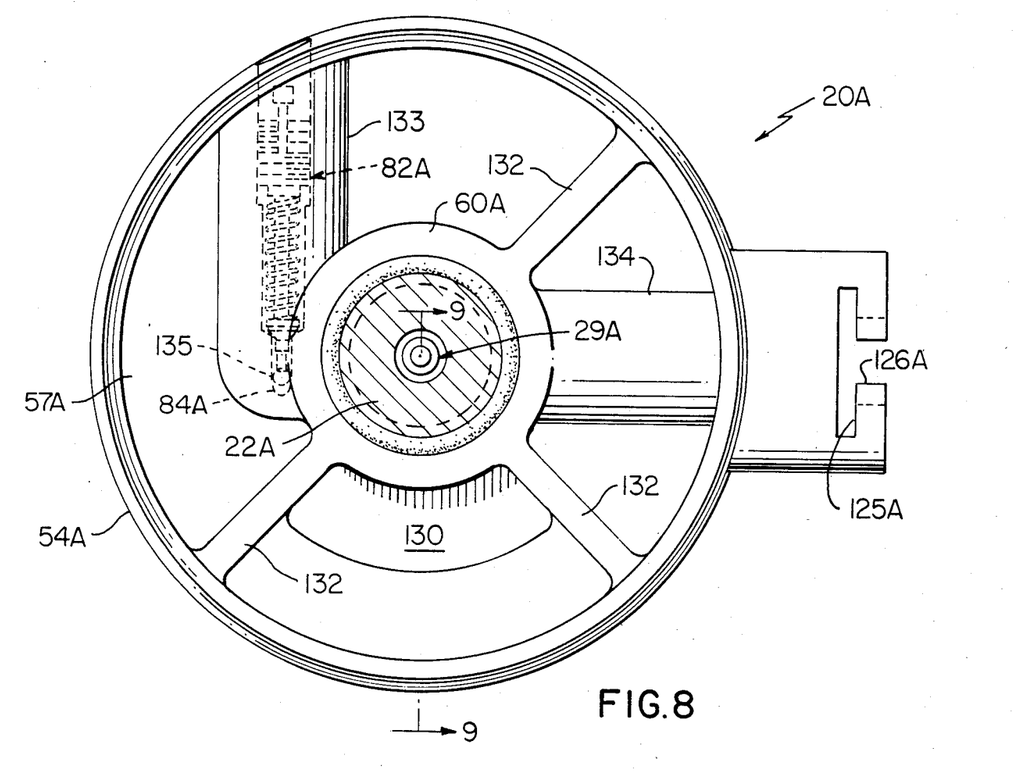
FIG. 8 is a cross-sectional view taken on line 8—8 of FIG. 7.

The propellant storage construction 20A includes the container 21A, adapter 22A and pressure regulator means 25A with the adapter 22A having been reduced in size because the housing member 54A of the housing means 53A has been modified to include the pressure relief valve means 82A therein as illustrated in FIG. 8 as well as integral burst section 130 for a purpose hereinafter described.

Figure 7:
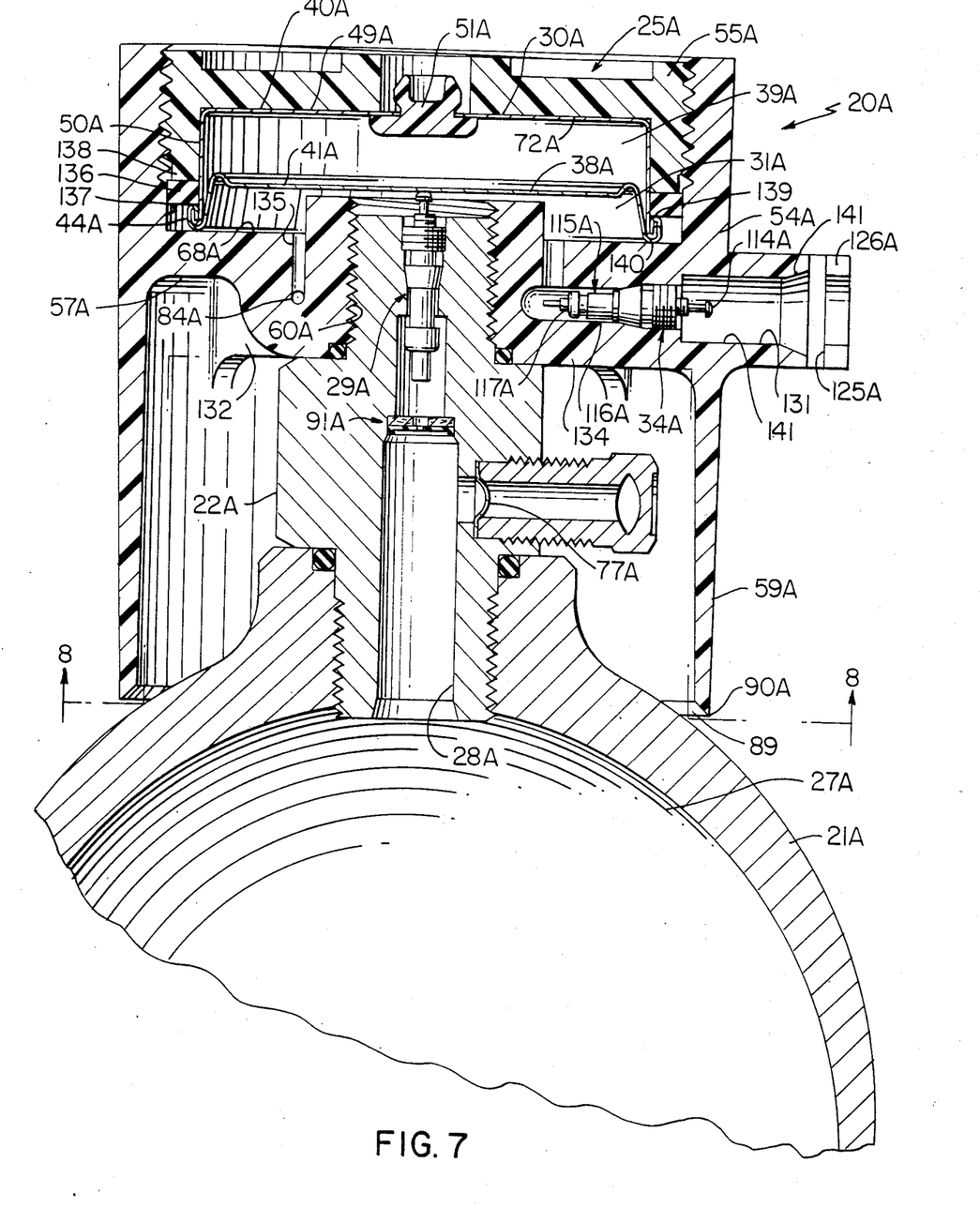
FIG. 7 is a view similar to FIG. 1 and illustrates another embodiment of the propellant storage construction of this invention.

However, the adapter 22A includes the flow control means 91A previously described and the valve unit 29A as previously described.

The pressure regulator means 25A has the housing member 54A thereof modified to include an enlarged portion 131 of the outlet means 34A thereof to accommodate the improved outlet coupling membe 33A of FIGS. 10 and 11 of the aforementioned co-pending application in a manner hereinafter described.

In addition, the cross member 57A of the housing member 54A has a plurality of reinforcing ribs 132, FIG. 8, radiating from the central threaded portion 60A thereof, the portions 133 and 134 of the cross portion 57A respectively for the pressure relief valve means 82A and the outlet passage means 116A also forming reinforcing rib-like portions with the spaced-apart ribs 132 as illustrated in FIG. 8.

The cross portion 57A of the housing member 54A has the flat annular surface 68A thereof interrupted by a passage means 135 that leads to the reduced portion 84A of the pressure relief valve means 82A so that the pressure relief valve means 82A will perform the desired function of maintaining the pressure value of the dispensed propellant in the output chamber 31A from exceeding a predetermined value as previously set forth in connection with the pressure relief valve means 82 of the propellant storage construction 20.

The annular surface 68A of the cross portion 57A of the housing member 54A is also interrupted by the outlet passage 116A as illustrated in FIG. 7.

The self-contained capsule 30A of the pressure regulator means 25A has the opposed wall 49A thereof substantially completely flat across the same and has the sealing means 51A previously described for permitting fluid to be injected into the resulting chamber 39A of the seamed together cup-shaped members 40A and 41A.

However, as previously stated, it was found that the rolled edge 44A of the self-contained capsule 30A, as well as the rolled edge of the self-contained capsule previously described, required lapping in order to form the same with a substantially true circular contact surface for sealing against the sealing means 69. Accordingly, it was found according to the teachings of this invention that an annular sealing member 136 could be disposed in sealing engagement against the side wall 50A of the capsule 30A as well as seal against an adjacent annular wall 137 of the housing member 54A as illustrated in FIG. 7 so that the output chamber 31A extends from the side sealing means 136 whereby it makes no difference whether or not the annular edge 44A of the capsule 30A makes sealing contact with the surface 68A of the housing member 54A completely around the same.

The housing member 55A has likewise been reshaped so that the surface 72A thereof substantially engages the entire flat surface 49A of the wall means 40A as illustrated to hold the lower portion 140 of the annular edge 44A against the annular flat 68A of the housing member 54A. It is preferred that the lower end 138 of the housing member 55A does not contact the sealing member 136 so that the same will float between the end 138 and the upper portion 139 of the annular edge 44A of the capsule 30A. However, it may be found that the end 138 of the housing member 55A can be made to be engagable against the sealing means 136 and even compress the sealing member 136 against the outer portion 139 of the annular edge 44A of the capsule 30A when the surface 72A of the housing member 55A is engaging against the flat surface 49A of the capsule 30A and is holding the lower portion 140 of the annular edge 44A against the surface 68A of the housing member 54A.

In any event, because the annular sealing member 136 seals against the side wall 50A of the capsule 30A intermediate the movable wall 38A and the opposed wall 49A thereof, the previously described expensive lapping or machining operation on the portion 140 of the rim 44A of the capsule 30A is no longer required.

Figure 9:
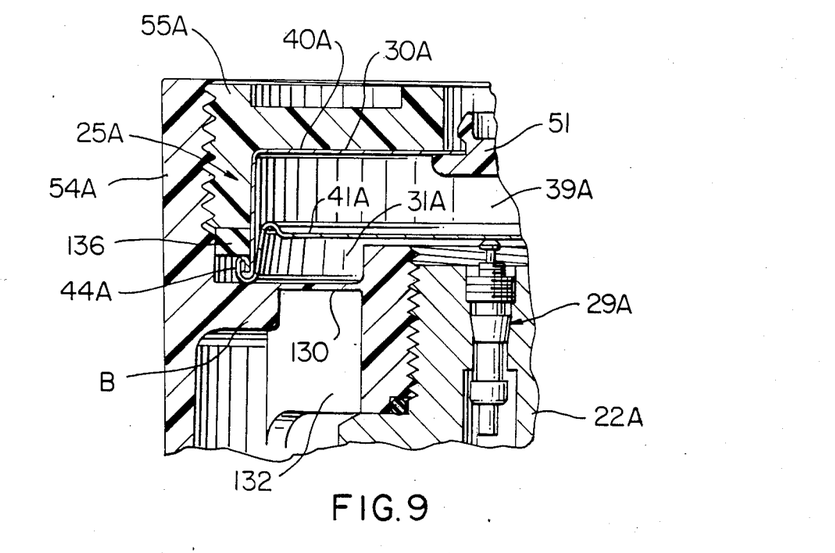
FIG. 9 is a fragmentary cross-sectional view taken on line 9—9 of FIG. 8.

As illustrated in FIG. 9, the burst section 130 comprises a relatively thin section of the portion 57A of the housing member 54A as represented by the normal thickness thereof adjacent the reference letter B of FIG. 9.

In this manner, should it be found that for some reason the valve unit 29A should fail and the resulting ice crystals should block the pressure relief valve means 82A or the pressure relief valve 82A also malfunctions for any reason, the resulting build-up of pressure in the output chamber 31A will fracture through the burst section 130 before the pressure reaches an adverse pressure value so that it can be seen that the burst section 130 is a back-up safety feature for the pressure relief valve means 82A previously described.

Therefore, it can be seen that the regulator means 25A and adapter 22A for the container 21A can be made in a relatively simple manner by the methods of this invention to operate in a manner now to be described.

When it is desired to dispense propellant from the storing chamber 27A through the conduit means 32A, the outlet coupling member 33A is disposed in the portion 131 of the outlet means 115A in a manner hereinafter described to open the valve unit 115A so as the pressure in the output chamber 31A falls, the movable wall 38A of the capsule 30A will open the valve unit 29A in the manner previously described.

The propellant flows to the output chamber 31A through the opened valve unit 29A to pass through the opened valve unit 115A, coupling member 33A and conduit 32A to the desired location, the flow control means 91A assuring that no ice particles reach the valve unit 29A for the reasons previously set forth in connection with the flow control means 91.

The pressure relief valve 82A prevents the pressure in the output chamber 31A from exceeding a certain value in the same manner as the pressure relief valve 82 previously described.

However, should the valve 29A and pressure relief valve 82A both fail so that propellant is permitted to continuously flow and build up pressure in the output chamber 31A, the burst section 130 will fracture between the adjacent ribs 132 to permit the pressure in the output chamber 31A to be expelled.

As stated in connection with the skirt 59 of the propellant storage construction 20 of FIG. 1, the end 90A of the skirt 59A of the housing means 53A is spaced sufficiently from the container 21A so that the annular space 89A therebetween will prevent any jet propulsion effect from expelled propellant should the burst section 130 fracture and/or the burst disc 77A of the adapter 22A fracture.

As previously stated, the outlet coupling member 33A is disclosed and claimed in the aforementioned co-pending patent application and does not form the subject matter of this invention. However, because the outlet coupling member 33A is the presently preferred outlet coupling member over the coupling member 33 previously described, the outlet coupling member 33A will now be described in detail.

It can be seen that the outward end or cylindrical section 131 of the outlet passage 116 has a large diameter and forms a mouth or frusto-conical section 141 that leads into the cylindrical section 131 as illustrated for a purpose hereinafter described, the frusto-conical section 141 terminating adjacent the locking surface means 125A.

The improved outlet coupling member 33A has a relatively long and substantially cylindrical body portion 105A that has an outer peripheral cylindrical surface 142 interrupted by an annular groove 143 intermediate the opposed ends 144 and 145 thereof. An annular resilient sealing member or O-ring 146 is disposed in the annular groove 143 and is of a size to project radially outwardly beyond the peripheral surface 142 of the body portion 105A so as to sealingly engage against the internal peripheral surface 147 of the cylindrical section 131 of the passage means 116A when the body portion 105A is inserted into the cylindrical section 31 in the manner illustrated in FIG. 10, the mouth 141 of the construction guiding the outlet coupling member 33A into aligned relation with the section 131 during such insertion.

Figures 10, 11:
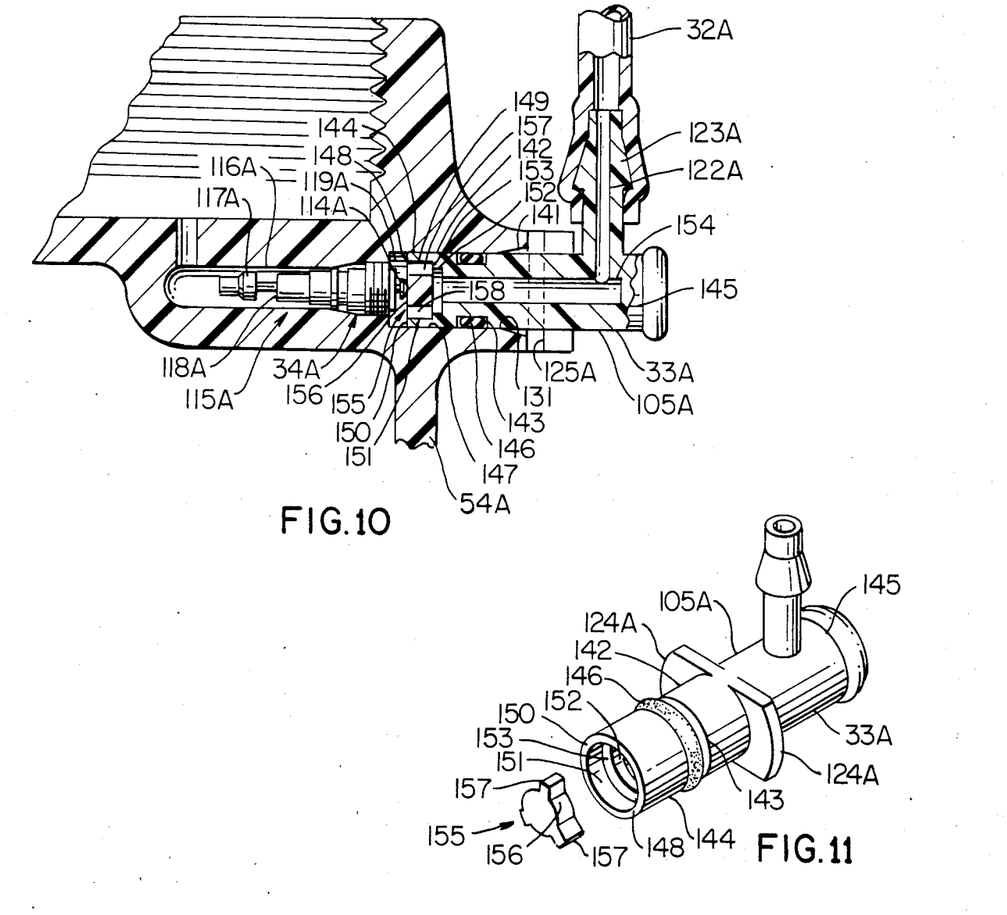
FIG. 10 is a view similar to FIG. 3 and illustrates the structure for dispensing propellant from the propellant storage construction of FIG. 7.
FIG. 11 is an exploded perspective view of the outlet coupling member being utilized to dispense the propellant in FIG. 10.

Because the outer peripheral surface 142 of the body portion 105A of the coupling member 33A is disposed closely adjacent the internal peripheral surface 147 of the passage section 131 as illustrated in FIG. 10, the surfaces 142 and 147 cooperate together to coaxially guide the body portion 105A into the section 131 so that the sealing member 146 is utilized solely for the purpose of sealing to the peripheral surface 147 of the passage section 131 outboard of the valve unit 115A so as to cooperate therewith to define the chamber 119A for feeding propellant dispensed through the valve unit 115A to the outlet coupling member 33A.

The body portion 105A of the outlet coupling member 33A has a transverse end of flat end surface 148 at the end 144 thereof interrupted by a stepped bore or passage 149 that causes the end surface 148 to define a substantially annular flat surface 150.

The stepped passage or bore 149 in the body portion 105A has the largest cylindrical section 151 thereof disposed adjacent the annular end surface 150 with the next largest cylindrical section 152 cooperating therewith to define an annular shoulder 153 inside the body portion 105A, the smallest cylindrical section 154 of the passage 149 leading to the passage 122A in the nipple 123A as illustrated in FIG. 10.

A star-like member is provided for the outlet coupling member 33A and is generally indicated by the reference numeral 155, the star-like member 155 having a substantially cylindrical central portion 156 and a plurality of circumferentially and equally spaced and radially outwardly extending substantially rectangular points 157 press-fittingly disposed into the section 151 of the passage 149 in the outlet coupling member 33A until one flat side of the star-like member 155 is disposed against the shoulder 153 at the outer portion of the points 157 thereof while the other opposed flat side thereof is disposed substantially coplanar with the annular end surface 150 as illustrated. The points 157 have arcuate outer end surfaces that press-fittingly engage against the internal peripheral surface of the passage section 51 as illustrated in FIG. 10 whereby a plurality of openings 158 are respectively defined between the points 157 and are disposed in a circular array adapted to be disposed concentric and outboard of the plunger 114A of the valve unit 115A when the outlet coupling member 33A is fully disposed in the passage section 131 as illustrated in FIG. 10. In this manner, the substantially flat surface of the central part 156 of the star-like member 155 engages against the plunger 114A to move the same inwardly to open the valve unit 115A as illustrated in FIG. 10 without having any tilting effect of the outlet coupling member 33A as is provided by the outlet coupling member 33 previously described.

In this manner, it is always assured that the valve plunger 114A will move the valve member 117A of the valve unit 115A to its open condition as illustrated in FIG. 10 each time the coupling member 33A is inserted into the outlet section 131 because the long cylindrical surface 142 of the body portion 105A is axially guided by the relatively long internal cylindrical peripheral surface 147 of the housing member 54A so that the flat end surface of the central portion 156 of the star-like member 155 will be properly aligned to engage the plunger 114A with the openings 158 being disposed a sufficient distance outboard of the plunger 114A so that the plunger 114A cannot slip into any one of the openings 158.

Therefore, it can be seen that the flat surface of the star-like members 155 and the coplanar flat annular surface 150 of the body portion 105A of the outlet coupling member 33A define a substantially flat end surface means.

As fully illustrated in FIG. 10, it can be seen that the section 152 of the passage 149 in the outlet coupling member 33A is of a sufficient diameter to be disposed in fluid communication with the openings 158 as the diameter of the section 152 is greater than the diameter of the central section 156 of the star-like member 155 whereby the propellant passing out of the opened valve unit 115A can pass into the openings 158 of the section 151 and from the section 151 into the section 152 between the points 157 and central section 156 of the star-like member 155 to thereby pass into the passage section 154 and out through the nipple 123A.

The body portion 105A of the outlet coupling member 33A is provided with a pair of opposed wing-like interlocking members 124A which respectively cooperate with the interlocking surface means 125A of the propellant storage construction 20A so as to prevent any attempt to cock the body portion 105A in the opening 131 of the construction 20A after the same has been fully inserted therein and been locked in place.

Therefore, it can be seen that the outlet coupling member 33A can be formed in a relatively simple manner to operate in a manner now to be described.

As long as the outlet coupling member 33A is in the out condition as illustrated in FIG. 7, the valve unit 115A is in its closed position to prevent propellant from the chamber 31A from passing through the valve unit 115A to the outlet end 131 of the passage 116A.

However, when it is desired to dispense propellant from the propellant storage construction 20A, the outlet coupling member 33A is inserted into the opening 131 while in a rotational position so that the wing-like interlocking members 124A thereof align with the suitable slots 126A of the construction 20A to permit the body portion 105A to be fully inserted into the cylindrical section 131 of the passage 116A so that the substantially flat end surface means of the body portion 105A will engage against the plunger 114A and axially move the same inwardly to the position illustrated in FIG. 10 to fully open the valve member 117A away from the valve seat 118A, the O-ring sealing member 146 fully sealing with the internal peripheral surface 147 of the construction 20A before the plunger 114A opens the valve seat 118A so that any propellant passing out of the valve unit 114A as the plunger 114A is being axially moved to its fully open position will be sealed in the resulting chamber 119A to only exit therefrom out through the opening means 158 in the end surface means of the outlet coupling member 33A.

Once the body portion 105A of the outlet coupling member 33A has been fully axially inserted in the outlet section 131, the body portion 105A is rotated 90° as illustrated in FIG. 10 to cause the wing-like members 124A thereof to interlock behind the surface means 125A of the construction 20A whereby the outlet coupling member 33A holds the valve unit 115A in its fully open position so that propellant from the chamber 31A will pass through the open valve unit 115A and into the opening means 158 in the end surface means of the body portion 105A of the outlet coupling member 33A and to the conduit 32A through the nipple 123A as illustrated. Thus, propellant will be supplied by the conduit means 32A for any desired purposes, such as for carbonating a beverage or the like.

Should it be desired to disconnect the outlet coupling member 33A from the construction 20A, the body portion 105A is merely rotated 90° from the position illustrated in FIG. 10 so that the wing-like members 124A will clear from behind the surface means 125A of the construction 20A to be coaxially moved out through the slots 126A as the body portion 105A is axially moved outwardly from the cylindrical section 131 of the passage 116A, the plunger 114A fully moving to its closed position before the O-ring sealing member 146 clears the peripheral surface 147 of the cylindrical section 131 of the passage 116A and enters the frusto-conical section 141 as illustrated.

Therefore, it can be seen that this invention not only provides an improved propellant storage construction and parts therefor, but also this invention provides improved methods of making such parts for a propellant storage construction.

While the forms and methods of this invention now preferred have been illustrated and described as required by the Patent Statute, it is to be understood that other forms and method steps can be utilized and still fall within the scope of the appended claims.

What is claimed is:

1. In a pressure regulator means for a propellant storage construction having a storing chamber for storing said propellant and a passage means leading to said storing chamber and containing a valve unit therein for opening and closing said passage means, said pressure regulator means to be operatively associated with said valve unit for operating said valve unit in relation to the pressure of said propellant, said pressure regulator means comprising a self-contained capsule having a movable wall for engaging said valve unit and an opposed wall spaced therefrom by a side wall, said pressure regulator means having wall means cooperating with said capsule to define an output chamber for receiving propellant dispensed from said storing chamber through said valve unit, annular sealing means disposed between and against said capsule and said wall means to define said output chamber therebetween, the improvement wherein said annular sealing means is telescoped onto said side wall of said capsule and thereby engages and seals against said side wall of said capsule intermediate said opposed wall and said movable wall of said capsule.

2. A pressure regulator means for a propellant storage construction as set forth in claim 1 wherein said pressure regulator means has retaining means engaging said opposed wall of said capsule and holding said capsule against said wall means.

3. A pressure regulator means for a propellant storage construction as set forth in claim 2 wherein said capsule engages said wall means intermediate said valve unit and said sealing means.

4. A pressure regulator means for a propellant storage construction as set forth in claim 3 wherein said capsule comprises two cup-shaped members having open ends crimped together to define an annular rolled edge of said capsule, said cup-shaped members having side walls and being telescoped together to define a chamber therebetween, one of said cup-shaped members having said closed end thereof defining said opposed wall of said capsule and said side wall thereof defining said side wall of said capsule, the other of said cup-shaped members having said closed end thereof defining said movable wall of said capsule.

5. A pressure regulator means for a propellant storage construction as set forth in claim 4 wherein said rolled edge of said capsule is held against said wall means by said retaining means.

6. A pressure regulator means for a propellant storage construction as set forth in claim 5 wherein said retaining means has an annular end in spaced axial alignment with said rolled edge of said capsule, said sealing means being disposed in floating relation on said side wall of said capsule between said end of said retaining means and said rolled edge of said capsule.

7. A pressure regulator means for a propellant storage construction as set forth in claim 1 wherein said wall means has an internally threaded opening passing therethrough for attaching said pressure regulator means to said storing chamber of said propellant storage construction.

8. A pressure regulator means for a propellant storage construction as set forth in claim 5 wherein said opposed wall of said capsule is substantially flat.

9. A pressure regulator means for a propellant storage construction as set forth in claim 8 wherein said retaining means engages substantially the entire flat opposed wall of said capsule.

10. A pressure regulator means for a propellant storage construction as set forth in claim 9 wherein said wall means of said construction has a substantially flat surface that is engaged by said rolled edge of said capsule.

11. A pressure regulator means for a propellant storage construction as set forth in claim 1 wherein said wall means of said pressure regulator means has an integral burst section that is adapted to fracture when the pressure valve of the propellant in said output chamber exceeds a certain value.

12. A pressure regulator means for a propellant storage construction as set forth in claim 11 wherein said pressure regulator means has a pressure relief valve operatively interconnected to said output chamber and being separate from said burst section thereof.

13. A pressure regulator means for a propellant storage construction as set forth in claim 12 wherein said burst section comprises a reduced thickness in said wall means.

14. A pressure regulator means for a propellant storage construction as set forth in claim 13 wherein said wall means has spaced apart reinforcing ribs, said burst section being disposed between two of said ribs.

15. A pressure regulator means for a propellant storage construction as set forth in claim 14 wherein said relief valve means also acts as one of said reinforcing ribs.

* * * * *